United States Patent [19]
Bell et al.

[11] Patent Number: 5,915,714
[45] Date of Patent: Jun. 29, 1999

[54] MULTI-ATTACHMENT SPIN HITCH SYSTEM AND METHOD

[76] Inventors: Foyster G. Bell, P.O. Box 418; James L. Bell, P.O. Box 163, both of Duchesne, Utah 84021

[21] Appl. No.: 09/097,417

[22] Filed: Jun. 15, 1998

[51] Int. Cl.[6] .............................. B60D 13/00; B60F 3/10
[52] U.S. Cl. ...................................... 280/456.1; 280/416.1
[58] Field of Search .............................. 280/416.1, 491.5, 280/504, 511, 456.1, 491.1, 415.1

[56] References Cited

U.S. PATENT DOCUMENTS

| | | | |
|---|---|---|---|
| 4,456,279 | 6/1984 | Dirck | 280/511 |
| 4,596,406 | 6/1986 | Van Vleet et al. | 280/511 |
| 5,106,114 | 4/1992 | Haupt | 280/416.1 |
| 5,476,279 | 12/1995 | Klemetsen | 280/416.1 |
| 5,839,744 | 11/1998 | Marks | 280/416.4 |
| 5,853,187 | 12/1998 | Maier | 280/495 |
| 5,857,693 | 1/1999 | Clak, Jr. | 280/415.1 |

*Primary Examiner*—Lanna Mai
*Assistant Examiner*—Faye M. Fleming
*Attorney, Agent, or Firm*—Townsend and Townsend and Crew

[57] ABSTRACT

The invention provides an exemplary hitching apparatus and methods for its use. In an exemplary embodiment, the hitching apparatus comprises a plate that defines an aperture for receiving a securing element so that the plate may be rotated about the securing element. At least two hitch connectors are coupled to the plate such that the plate may be rotated to selectively place one of the hitch connectors in a loading position.

18 Claims, 3 Drawing Sheets

MULTI-ATTACHMENT SPIN HITCH SYSTEM AND METHOD

BACKGROUND OF THE INVENTION

This invention relates to the field of hitches, and more particularly, to hitching apparatus and systems having multiple hitch connectors so that trailers having a variety of mating connectors may be coupled to a vehicle.

A wide variety of connectors exist for connecting a vehicle to be towed, such as a trailer, to a towing vehicle, such as a car, truck or tractor. For example, one popular type of connector is a ball and socket hitch connector. Such ball and socket hitch connectors typically comprise a spherical body or ball connector that is attached to the frame or tow bar of a towing vehicle. The tongue or hitch of the vehicle to be towed is equipped with a socket which is configured to fit over the spherical body or ball connector. The socket typically includes moveable jaws that may be tightened under the spherical body to prevent the socket from being removed during towing. The ball and socket hitch devices have likely achieved their popularity because of their safety, ease in connection and disconnection, and their ability to allow the towed vehicle to conveniently pivot about the spherical body.

One problem associated with hitch connectors of all types is that the portion of the connector on the towing vehicle often does not correspond to the portion of the hitch connector on the vehicle to be towed. As one example, with ball and socket hitch connectors, the spherical body of the ball connector often does not match with the socket on the hitch of the vehicle to be towed. As such, a variety of problems may arise. For example, if the ball connector is too large for the socket, the socket will not fit over the ball connector and, thus, the towing vehicle cannot be connected to the vehicle to be towed. Alternatively, if the spherical ball connector is too small for the socket, a secure connection of the socket to the ball connector may not be provided. As such, a safety hazard can result from an ineffective connection between the towing vehicle and the vehicle to be towed.

Since many trailers are equipped with a variety of different sized sockets and connectors, it is often necessary to change the portion of the hitch on the towing vehicle to match that on the trailer. Hence, if one has a variety of trailers to be towed, one may have to obtain a large inventory of hitch connectors, and then repeatedly change the connectors in order to accommodate the hitch arrangement on the trailer. Hence, it would be desirable to provide systems, apparatus and methods which would accommodate various hitch arrangements on a vehicle to be towed, such as a trailer. Preferably, such systems, apparatus and methods will be easy and convenient to use so that a user may conveniently match and couple the appropriate connector to the connector on the vehicle to be towed. Further, such systems, apparatus and methods should be rugged and durable so that they will provide an adequate degree of safety when towing a vehicle.

SUMMARY OF THE INVENTION

The invention provides exemplary systems, apparatus and methods for coupling the vehicle to be towed, such as a trailer, to a towing vehicle. In one exemplary embodiment, a hitching apparatus is provided which comprises a plate having an aperture which is adapted to receive a securing element such that the plate is rotatably about the securing element. At least two hitch connectors are coupled to the plate such that the plate may be rotated to selectably place one of the hitch connectors in a loading position. In this way, a user is provided with an assortment of hitch connectors which may be individually selected in order to match a mating connector on the trailer.

Preferably, the hitching apparatus is part of a system which includes a top plate which may be mounted to the vehicle. The plate having the two hitch connectors, also referred to as the bottom plate, is rotatably coupled to the top plate by the securing element so that the bottom plate may be rotated to selectably place one of the hitch connectors in the loading position where it may be coupled with a mating connector on the vehicle to be towed.

In one particular aspect, the hitch connectors comprise ball and hitch connectors which are adapted to be coupled to a hitch socket. Alternatively, the hitch connectors may comprise any one of a variety of connectors, such as easy-lift connectors, Pendle hook connectors, and the like. Conveniently, a tubular member may be coupled to the plate so that a removable hitch connector may be coupled to the plate by inserting the removable hitch connector into the tubular member. In one aspect, the tubular member includes a pair of aligned holes, and a pin is provided which may be slid through the holes after insertion of the removable hitch connector to secure the removable hitch connector to the tubular member.

In another aspect, the bottom plate is generally circular in geometry. In another aspect, the hitch connectors are coupled to the plate so that they extend beyond an outer periphery of the plate to facilitate access to the connectors. In still another aspect, a pair of pins are provided on the top plate which may be moved to engage holes on the bottom plate to fix the position of the bottom plate relative to the top plate once within the loading position.

The invention further provides an exemplary method for coupling a trailer to a vehicle. According to the method, a hitching apparatus is provided which comprises a plate having an outer periphery and at least two hitch connectors which are coupled to the plate. Further, the plate is rotatably coupled to a vehicle. When ready to couple a trailer to the vehicle, the plate is rotated to place one of the hitch connectors in a loading position where the hitch connector may be coupled to a mating connector on the trailer. The hitch connector is then coupled with the mating connector on the trailer to couple the trailer to the vehicle.

Since the plate includes multiple hitch connectors, the same vehicle may easily and conveniently be uncoupled from the trailer and coupled to another trailer having a different type of mating connector. This is accomplished by uncoupling the first trailer, rotating the plate to place another one of the hitch connectors in the loading position, and coupling the new hitch connector with the other trailer.

Conveniently, the plate further includes a tubular member so that a removable hitch connector may be coupled to the plate by inserting the removable hitch connector into the tubular member. Such a configuration is advantageous in the event that the plate does not include a hitch connector suitable for coupling with a connector on a trailer. To couple the vehicle to the trailer, the appropriate hitch connector is simply inserted into the tubular member and then coupled to the mating connector on the trailer.

In one particular aspect, rotation of the plate relative to the vehicle is prevented once the hitch connector is placed in the loading position. In this way, the hitch connector will be appropriately secured prior to its coupling to a mating connector on the trailer. Conveniently, the plate may be coupled to a frame of the vehicle by a coupling member. For example, a bolt may be inserted through the plate and into the coupling member so that the plate is free to rotate relative the frame of the vehicle. To prevent rotation of the plate relative to the coupling member, a pin extending from the coupling member may be inserted into a hole in the plate.

DESCRIPTION OF THE PREFERRED EMBODIMENT

Figure 1:
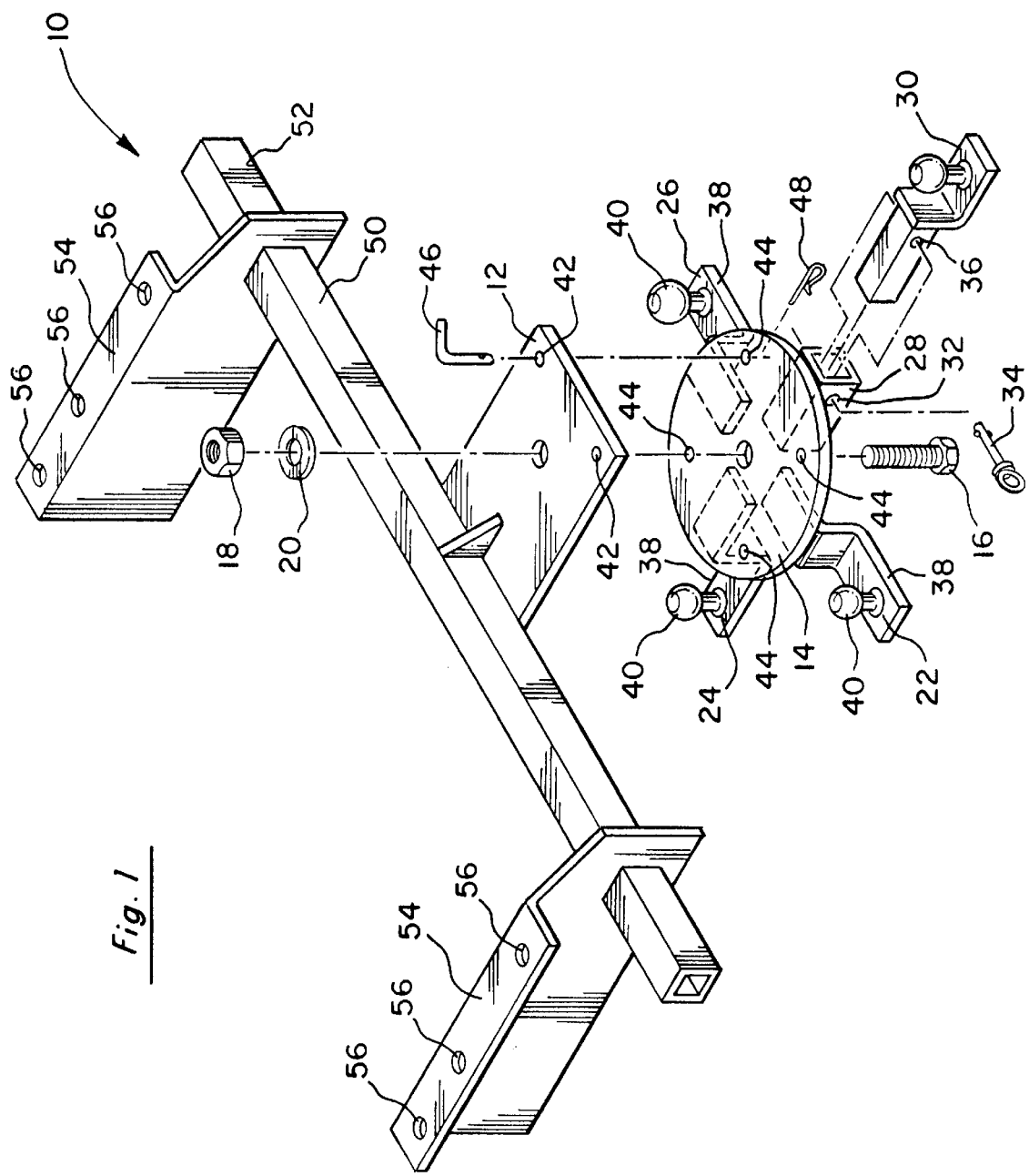
FIG. 1 is an exploded perspective view of an exemplary hitching system according to the invention.

Referring now to FIG. 1, an exemplary embodiment of a hitching system 10 will be described. System 10 comprises a top plate 12 and a bottom plate 14. Plates 12 and 14 are rotatably coupled together with a bolt 16 and nut 18. Conveniently, a washer 20 is disposed between nut 18 and top plate 12. When coupled together, bottom plate 14 may rotate 360° relative to top plate 12.

Coupled to bottom plate 14 are various hitch connectors. For example, as shown, bottom plate 14 includes a one and three quarter inch ball connector 22, a one and seven eighth inch ball connector 24 and a two and five sixteenth inch ball connector 26. Ball connectors 22, 24 and 26 are conventional ball connectors as is known in the art and are adapted to be coupled to a hitch socket on a trailer as is known the art. Also coupled to bottom plate 14, is a tubular member 28. Slidable within tubular member 28 is a two inch slideout ball connector 30. Tubular member 28 includes a pair of aligned holes 32 (one being hidden from view) through which a self-locking pin 34 may be inserted. Slide out ball connector 30 also includes a pair of holes 36 (one being hidden from view). To securely couple slide out ball connector 30 with tubular member 28, holes 36 are aligned with holes 32 and self-locking pin 34 is inserted through holes 32 and 36. One particular advantage of employing tubular member 28, is that a variety of slide out ball connectors with different ball sizes may be coupled to tubular member 28. In this manner, system 10 may be configured to be compatible with a wide variety of trailers.

Ball connectors 22, 24 and 26 are each constructed of an S-shaped tongue 32 which is securely affixed to bottom plate 14, preferably by a weld. Coupled to each tongue 38 is a ball 40, with each ball having a different diameter as previously described. Balls 40 may be fixedly attached to tongue 38 or may be removably attached, such as with the use of a bolt. Removable attachment of balls 42 to tongues 38 is advantageous in that the balls may conveniently be replaced, either with the same sized or a different sized ball.

As shown, bottom plate 14 includes four different connectors so that four different mating connectors on a trailer may be coupled to hitching system 10 simply by rotating bottom plate 14 to align the appropriate connector with the mating connector of the trailer. As previously described, the four connectors may be modified by replacing the ball sized on ball connectors 22, 24 or 26, or by inserting a slide out ball connector into tubular member 28. In addition, the number of connectors attached to bottom plate 14 may be different from that shown in FIG. 1. For example, bottom plate 14 may include only a single connector or multiple connectors. Further, in addition to ball connectors, a variety of other connectors may be coupled to bottom plate 14, including easy-lift connectors, Pendle hook connectors, e.g., clamp or grab hook connectors, and the like. Such connectors may either be removably or fixedly attached to bottom plate 14.

Although shown as being circular in geometry, it will be appreciated that bottom plate 14 may be provided with a variety of shapes. For example, bottom plate 14 may have any geometry as long as it is able to rotate relative to top plate 12. Further, although a bolt as shown as the connector between the bottom plate 14 and top plate 12, it will be appreciated that a variety of other connectors may be used, including pivot pins, and the like.

Top plate 12 includes a pair of through holes 42 and bottom plate 16 also includes a plurality of through holes 44. System 10 further includes a "L" pin 46 that is insertable through one of through holes 42 and 44 when the through holes are aligned. In this way, a mechanism is provided to prevent rotation of bottom plate 14 relative to top plate 12 after the desired connector is moved to a loading position. A cotter pin 48 is provided to secure "L" pin 46 in place once inserted through holes 42 and 44. Two through holes 42 are provided to allow "L" pin 46 to be inserted at either side of top member 12. As will be appreciated, other securing mechanisms may be provided to prevent rotation of base plate 14 relative to top plate 12. For example, system 10 may include a clamp, a latch, and the like to prevent such rotation.

Top member 12 is affixed to a frame 50 which comprises a steel shaft 52 and a pair of side arms 54. Side arms 54 each include a plurality apertures 56 to allow frame 50 to be coupled to a vehicle as illustrated in FIG. 2.

Figure 2:
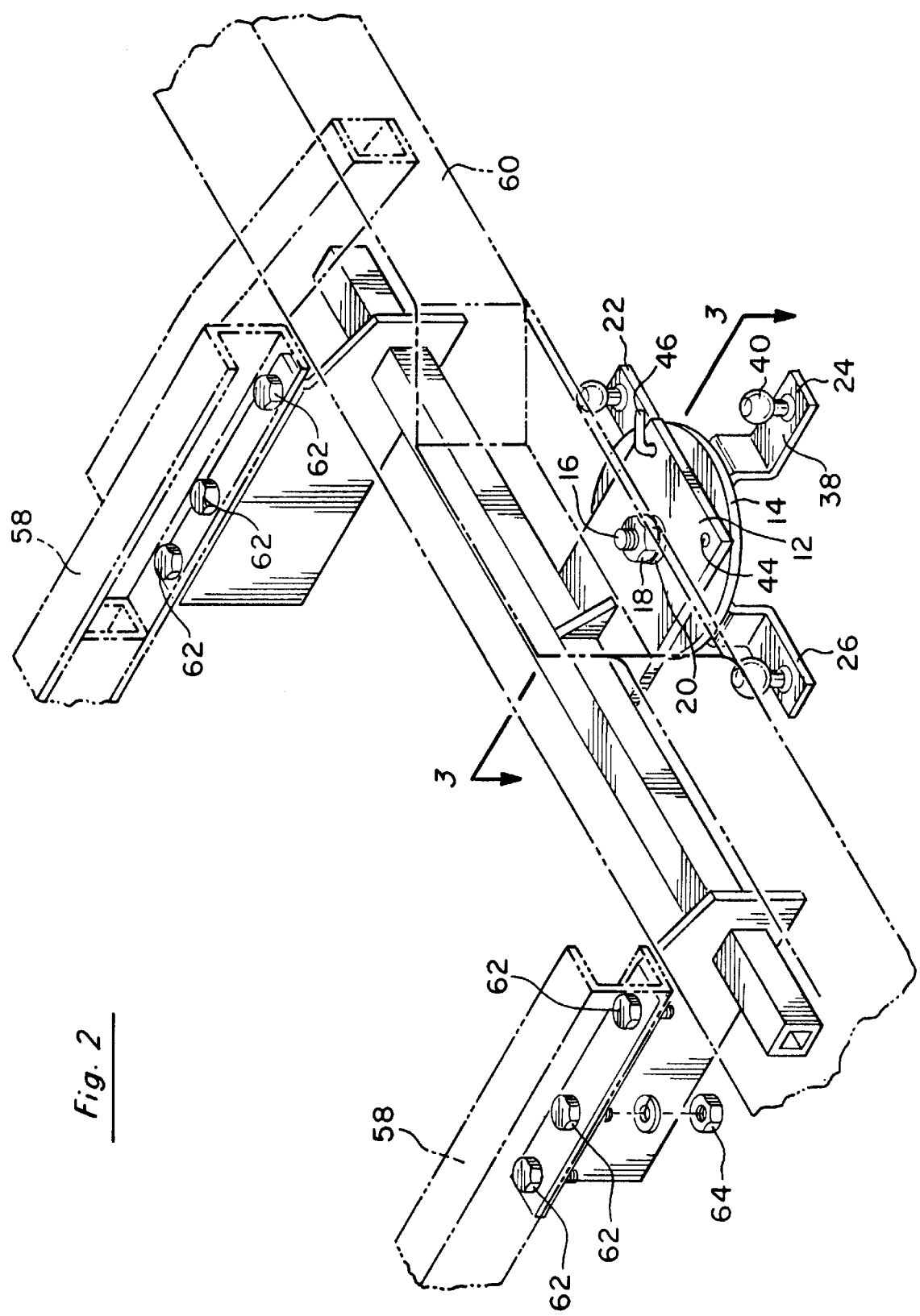
FIG. 2 illustrates the hitching system of FIG. 1 attached to a chassis of a vehicle and having a bottom plate rotated 180°.

In FIG. 2, a chassis 58 of a vehicle is shown in phantom line. Also shown in phantom line, is a rear bumper 60 of the vehicle. Frame 50 is attached to chassis 58 by inserting bolts 62 through apertures 56 and securing bolts 62 with a nut 64. In this manner, most commercially available vehicles, such as pickup trucks, sport utility vehicles, and the like may be modified to include hitching system 10 merely by drilling a few holes in the chassis and then coupling frame 50 to the chassis. Although a particular embodiment of a frame is shown to couple bottom plate 14 to a vehicle, it will be appreciated that a wide variety of frames or the securing mechanisms may be provided depending on the nature of the vehicle to which the bottom plate is to be coupled.

Figure 3:
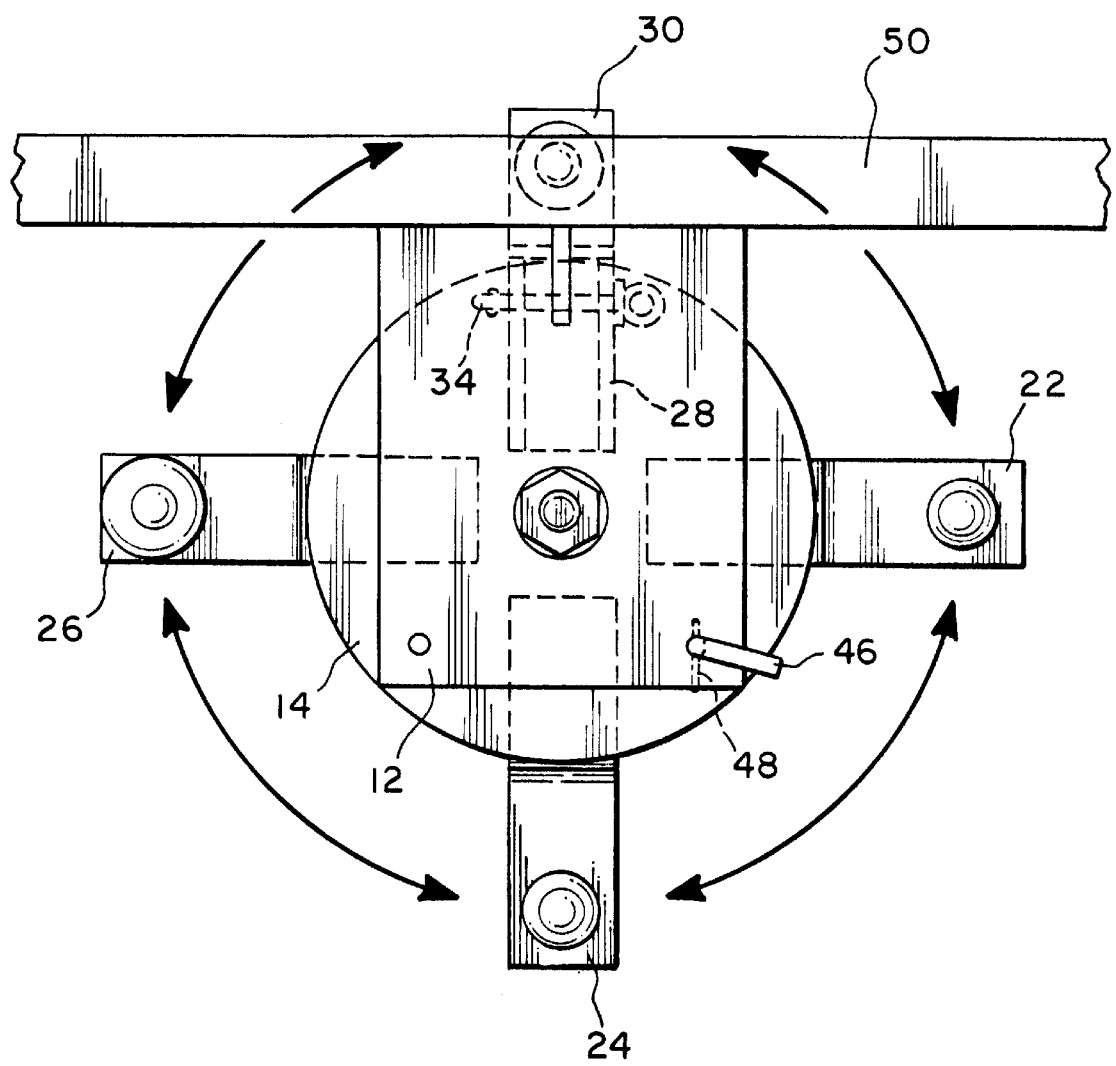
FIG. 3 is a top view of the hitching system of FIG. 2 illustrating the manner of rotation of the bottom plate.

Referring now to FIG. 3, a method of operating hitching system 10 will be described. As shown, ball connector 24 is in a loading position where it may be coupled to a mating connector of a trailer. When it is desired to employ the use of another connector, cotter pin 48 is removed from "L" pin 46 and "L" pin 46 is removed from bottom plate 14. Bottom plate 14 is then rotated relative to top plate 12 as illustrated by the arrows to place any one of connectors 22, 26 or 30 in the loading position. "L" pin 46 is then inserted back through hole 44 in bottom plate 14 and cotter pin 48 is inserted back into "L" pin 46. The ball connector that is in the loading position may then be coupled to a mating connector of a trailer. As previously described, when slide out ball connector 30 is placed in the loading position, it may conveniently be replaced with another slide out ball connector simply by removing self-locking pin 34 and sliding another connector into tubular member 28.

The various components of hitching system 10 are preferably constructed of a rigid and durable material, preferably being steel. However, it will be appreciated that other materials may be employed, including composites, ceramics, and the like.

The invention has now been described in detail. However, it will be appreciated that certain changes and modifications may be made. Therefore, the scope and content of this invention are limited by the foregoing description. Rather, the scope and content are to be defined by the following claims.

What is claimed is:

1. A hitching apparatus comprising:
   a plate defining an aperture which is adapted to receive a securing element such that the plate is rotatable about the securing element; and
   at least two hitch connectors coupled to the plate such that the plate may be rotated to selectively place one of the hitch connectors in a loading position, wherein the hitch connectors comprise ball hitch connectors which are adapted to be coupled to a hitch socket.

2. An apparatus as in claim 1, further comprising a tubular member coupled to the plate, wherein the tubular member is adapted to receive a removable hitch connector.

3. An apparatus as in claim 2, wherein the tubular member defines a pair of aligned holes, and further comprising a pin slidable through the holes, wherein the pin is adapted to couple the removable hitch connector to the tubular member.

4. An apparatus as in claim 1, wherein the plate is generally circular in geometry, and wherein the hitch connectors are coupled to the plate to extend beyond an outer periphery of the plate.

5. A hitching system comprising:
   a top plate which is adapted to be coupled to a vehicle;
   a bottom plate rotatably coupled to the top plate, the bottom plate having an outer periphery; and
   at least two hitch connectors coupled to the bottom plate such that the bottom plate may be rotated to selectively place one of the hitch connectors in a loading position where the hitch connector may be coupled to a mating connector.

6. A system as in claim 5, further comprising a frame which is attached to the top plate, and wherein the frame is adapted to be coupled to a chassis of the vehicle.

7. A system as in claim 5, wherein the bottom plate includes an aperture, and further comprising a bolt which is received through the aperture to rotatably couple the bottom plate to the top plate.

8. A system as in claim 5, further comprising a tubular member coupled to the bottom plate, wherein the tubular member is adapted to receive a removable hitch connector.

9. A system as in claim 8, wherein the tubular member defines a pair of aligned holes, and further comprising a pin slidable through the holes, wherein the pin is adapted to couple the removable hitch connector to the tubular member.

10. A system as in claim 5, wherein the plate is generally circular in geometry, and wherein the hitch connectors extend beyond the periphery of the plate.

11. A system as in claim 5, wherein the hitch connectors comprise ball hitch connectors.

12. A system as in claim 5, wherein the top plate and the bottom plate each include at least one through hole, and further comprising a pin which is slidable through the through holes when aligned to prevent rotation of the top plate relative to the bottom plate.

13. A method for coupling a trailer to a vehicle, the method comprising;
    providing a hitching apparatus comprising a plate having an outer periphery and at least two hitch connectors which are coupled to the plate, wherein the plate is rotatably coupled to a vehicle;
    rotating the plate to place one of the hitch connectors in a loading position where the hitch connector may be coupled to a mating connector on a trailer;
    coupling the hitch connector with the mating connector on the trailer to couple the trailer to the vehicle, wherein the coupling step comprises inserting a ball of the hitch connector into a socket of the mating connector; and
    wherein a tubular member is coupled to the plate, and further comprising inserting a removable hitch connector into the tubular member.

14. A method as in claim 13, further comprising uncoupling the hitch connector from the mating connector, rotating the plate to place another one of the hitch connectors in the loading position, and coupling the hitch connector in the loading position with a mating connector on another trailer.

15. A method as in claim 13, further comprising preventing rotation of the plate relative to the vehicle once the hitch connector is placed in the loading position.

16. A hitching apparatus comprising:
    a plate defining an aperture which is adapted to receive a securing element such that the plate is rotatable about the securing element;
    at least two hitch connectors coupled to the plate such that the plate may be rotated to selectively place one of the hitch connectors in a loading position; and
    a tubular member coupled to the plate, wherein the tubular member is adapted to receive a removable hitch connector.

17. A hitching apparatus comprising:
    a plate defining an aperture which is adapted to receive a securing element such that the plate is rotatable about the securing element; and
    at least two hitch connectors coupled to the plate such that the plate may be rotated to selectively place one of the hitch connectors in a loading position;
    wherein the plate is generally circular in geometry, and wherein the hitch connectors are coupled to the plate to extend beyond an outer periphery of the plate.

18. A method for coupling a trailer to a vehicle, the method comprising:
    providing a hitching apparatus comprising a plate having an outer periphery and at least two hitch connectors which are coupled to the plate, wherein the plate is rotatably coupled to a vehicle;
    rotating the plate to place one of the hitch connectors in a loading position where the hitch connector may be coupled to a mating connector on a trailer; and
    coupling the hitch connector with the mating connector on the trailer to couple the trailer to the vehicle;
    wherein a tubular member is coupled to the plate, and further comprising inserting a removable hitch connector into the tubular member.

* * * * *